(12) United States Patent
Ferrer

(10) Patent No.: US 6,311,924 B1
(45) Date of Patent: Nov. 6, 2001

(54) DEVICE AND PROCESS FOR REDUCING THE VIBRATION GENERATED ON THE STRUCTURE OF A ROTARY-WING AIRCRAFT, PARTICULARLY A HELICOPTER

(75) Inventor: Rogelio Ferrer, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/407,375

(22) Filed: Sep. 28, 1999

(30) Foreign Application Priority Data

Oct. 12, 1998 (FR) .................................................. 98 12726

(51) Int. Cl.⁷ .................................................. B64C 27/54
(52) U.S. Cl. .......................................................... 244/17.13
(58) Field of Search .................................... 244/1 R, 1 N, 244/17.11, 17.13, 17.27, 75 A; 416/24, 116, 144, 145; 73/455, 456; 74/572, 573 R, 574

(56) References Cited

U.S. PATENT DOCUMENTS

| | | | |
|---|---|---|---|
| 3,649,132 | * | 3/1972 | Arcidiacono ............................ 416/18 |
| 3,754,838 | * | 8/1973 | Ru et al. ................................ 416/145 |
| 3,952,601 | * | 4/1976 | Galli et al. ............................... 73/455 |
| 4,150,920 | * | 4/1979 | Belko et al. ........................... 416/145 |
| 4,461,611 | * | 7/1984 | Michel .................................... 416/24 |
| 4,601,639 | * | 7/1986 | Yen et al. .............................. 416/230 |
| 4,819,182 | * | 4/1989 | King et al. ............................ 364/508 |
| 4,937,758 | | 6/1990 | Hayden et al. . |
| 5,150,855 | * | 9/1992 | Kaptein ................................. 244/1 N |
| 5,219,143 | * | 6/1993 | Staple et al. ........................... 248/550 |
| 5,242,130 | * | 9/1993 | Mouille et al. ..................... 244/17.13 |
| 5,273,398 | * | 12/1993 | Reinfelder et al. ................... 416/144 |
| 5,304,038 | * | 4/1994 | MacMurray .......................... 416/144 |
| 5,588,800 | * | 12/1996 | Charles et al. .......................... 416/24 |
| 5,711,651 | * | 1/1998 | Charles et al. .......................... 416/24 |
| 5,853,144 | * | 12/1998 | Vincent .............................. 244/17.13 |
| 6,062,818 | * | 5/2000 | Manfredotti et al. ................ 416/145 |
| 6,139,271 | * | 10/2000 | Chadwick ............................. 416/145 |

OTHER PUBLICATIONS

French Search Report dated Jul. 9, 1999.
J. Vincenti, et al., "Equilibrage Des Rotors D'Helicoptere. Balance of Helicopter Rotors," Mecanique Industrielle et Materiaux, vol. 50, No. 1, Mar. 1, 1997, pp. 24–26, XP000702392.
R. O. Vorwerg, et al., "Dynamic Blase Selection—A Procedure to Get Inter–Changeability of the Modern EC135—Main Rotor Blades," Annual Forum of the American Helicopter Society, Jan. 1, 1997, pp. 258–270, XP000199491.
A. Rosen, et al., "Mathematical Modelling of a Helicopter Rotor Track and Balance: Theory," Journal of Sound and Vibration, No. 5, Mar. 13, 1997, pp. 589–603, XP002107205.

\* cited by examiner

*Primary Examiner*—Peter M. Poon
*Assistant Examiner*—Kevin Jakel
(74) *Attorney, Agent, or Firm*—Stevens, Davis, Miller & Mosher, LLP

(57) ABSTRACT

The present invention relates to a device and to a process for reducing the vibration generated on the structure of a rotary-wing aircraft, particularly a helicopter, which comprises at least one main rotor providing lift and forward drive.

According to the invention, said device comprises adjusting means (M1) for adjusting the second mode of flapping of each of the blades (2) of said main rotor.

11 Claims, 1 Drawing Sheet

DEVICE AND PROCESS FOR REDUCING THE VIBRATION GENERATED ON THE STRUCTURE OF A ROTARY-WING AIRCRAFT, PARTICULARLY A HELICOPTER

BACKGROUND OF THE INVENTION

The present invention relates to a device and to a process for reducing the vibration generated on the structure of a rotary-wing aircraft, particularly a helicopter.

It is known that the main source of vibration in a helicopter is the main rotor thereof which provides lift and forward drive. Such vibration constitutes a significant problem which needs to be addressed, because this vibration causes:

cyclic stresses throughout the helicopter, leading to phenomena of fatigue and therefore having a direct influence on safety; and vibration in the cabin, which is, of course, highly prejudicial to the comfort of pilots and passengers.

A well-adjusted and fault-free helicopter causes the fuselage to vibrate at frequencies which are a multiple of $b\Omega$, b being the number of blades and $\Omega$ the rotational frequency of the main rotor.

The occurrence of frequencies other than harmonies of $\Omega$ indicates faults. Likewise, an increase in the intensity of said harmonics may also betray the emergence of faults of various types.

By way of example, it may be noted that, in the case of vibrations:

the frequency $1\Omega$ represents the emergence of an imbalance in the wing structure, the source of which, may, in particular, be detachment at the leading edge of the blades, defective mast bearings, or a problem with the stiffness of the drag dampers; and the frequency $4\Omega$ is the natural frequency of vibration of a helicopter with a four-bladed rotor. This frequency must not change for a given flight configuration. Its degradation is generally caused by a problem in the connection between the main transmission gearbox and the fuselage.

DESCRIPTION OF THE PRIOR ART

U.S. Pat. No. 4,937,758 discloses a process and a device for reducing the vibration generated by the main rotor of a helicopter. This known document recommends that the following operations be performed:

a) measuring the values of measurement parameters that represent the vibration of said structure;

b) determining, on the basis of these measured values and of a predetermined influence matrix, the adjustment values of adjustment parameters capable of reducing and of minimizing said vibration; and c) adjusting said adjustment parameters to said adjustment values.

This known device and this known process, which allow a certain number of different vibrations to be minimized, do, however, have a major drawback: they do not allow vibrations of the structure of frequency other than $1\Omega$ and $2\Omega$ to be reduced.

It is known that in the case of a helicopter comprising a four-bladed rotor, the vibrations in $3\Omega$ combine with the natural vibrations in $4\Omega$ in such a way as to give rise to a vibration which is felt as an unpleasant knocking at $1\Omega$ and which is highly prejudicial, particularly to the comfort of crew and passengers.

SUMMARY OF THE INVENTION

The object of the present invention is to overcome these drawbacks. The invention relates to a device for reducing the vibrations in all the harmonics, and particularly the vibrations in $3\Omega$, generated on the structure of a rotary-wing aircraft, particularly a helicopter, at a rotational speed $\Omega$, and to thus increase the comfort of passengers and crew.

To this end, according to the invention, said device comprises adjusting means for adjusting the second mode of flapping of each of the blades of the main rotor which provides said rotary-wing aircraft with lift and forward drive.

Thus, by virtue of the invention, the natural frequency of each blade, which corresponds to the second mode of flapping of the blade, can be adjusted and therefore moved away from the $2\Omega$ and $3\Omega$ harmonics of the rotational speed, between which this frequency is defined, so as, in particular, to reduce the vibrations in $3\Omega$.

What happens is that the main cause of said $3\Omega$ vibrations in a stationary frame of reference associated with the structure, is an excitation resulting essentially from the second mode of flapping of the blades, the frequency of which is close to a frequency of the structure which frequency is, itself, of the order of $3\Omega$. This main cause is therefore eliminated by moving the frequency of said second mode of flapping far enough away from said frequency.

Furthermore, said natural frequency needs to be adjusted to move it away from the $3\Omega$ harmonic and, in particular, by way of example, to make it below:

$2.6\Omega$, in the case of a three- or five-blade aircraft; and $2.7\Omega$, in the case of a four-blade aircraft.

Advantageously, said adjusting means comprise adjusting masses, preferably metal washers of varying thickness and density, arranged along the span of each blade and/or arranged at various points along the chord.

Furthermore, in a preferred embodiment, said device additionally comprises:

a number of sensors, for example accelerometers, capable of measuring the values of measurement parameters that represent the vibration of said structure;

additional adjusting means capable, as a function of the adjusting values, of adjusting adjustment parameters capable of reducing the vibrations of said structure; and a calculation unit, preferably a personal computer, capable, on the basis of the values measured by said sensors, of calculating the adjusting values of said adjusting means and of said additional adjusting means to allow the vibrations to be minimized, the adjusting values thus calculated being applied to said adjusting means and to said additional adjusting means.

It is thus possible to reduce and to minimize most of the various vibrations generated by said main rotor.

Furthermore, advantageously, said additional adjusting means comprise at least one of the following elements:

auxiliary masses arranged in the cuffs of the blades;

pitch rods; and balance tabs.

The present invention also relates to a process for reducing the vibration generated by a main rotor on the structure of a rotary-wing aircraft, and more particularly, to a process such as the one disclosed in the aforementioned U.S. Pat. No. 4,937,758, and according to which:

a) the values of measurement parameters that represent the vibration of said structure are measured;

b) on the basis of these measured values, the adjustment values of adjustment parameters capable of reducing and of minimizing said vibration, are determined; and c) said adjustment parameters are adjusted to said adjustment values.

According to the invention, said process is noteworthy in that wherein at least the second mode of flapping of each of the blades of a main rotor providing said rotary-wing aircraft with lift and forward drive is adjusted by way of an adjustment parameter, which, in particular, allows vibration in 3Ω to be reduced.

Furthermore, advantageously, in the aforementioned step b) said adjustment values are determined using an influence matrix:

which is formed on a reduced-vibration aircraft, from a number of different adjustments and measured values of said measurement parameters each or which is the result of these different adjustments; and/or which is formed taking account of the following assumptions:
all the blades of said main rotor have the same behavior;
said aircraft represents a solid body; and
the relationship between the adjustment values and the measured values is a linear relationship.

Furthermore, advantageously, in order to determine all of the adjustment values Pn+1 for a particular flight n+1, a matrix is minimized, said matrix Γn+1 representing said vibrations and being obtained from the expression:

$$\Gamma n+1 = M(Pn+1-Pn) + \Gamma n$$

in which:

M is the influence matrix;

Pn is the set of adjustment values from the previous flight n; and

Γn is a matrix containing all of the measurement values of said flight n which represent the vibrations and which are the result of the adjustment values Pn.

It will be recalled that the aforementioned U.S. Pat. No. 4,937,758 does not, unlike the invention (with masses arranged along the span and/or along the chord) teach how to adjust the second mode of flapping of the blades, and therefore does not allow vibration in 3Ω to be reduced.

The influence matrix used in this prior document is therefore far less rich than the one recommended by the present invention. Furthermore, this known influence matrix is determined by assuming that there is a relationship between the adjustments and the resulting vibrations, which relationship is given by a pre-set mathematical expression. This mathematical expression has certain properties (periodicity, symmetry) which influence the value of the coefficients used, and this therefore harms the precision of the adjustments determined in this way.

By contrast, the method according to the invention is not based on such assumptions but looks for direct relationships (by pure identification) which there are between the operation of the rotor and the levels of vibration of the structure, so as to obtain precise and effective adjustment values.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENT

The device 1 according to the invention is intended to reduce the vibrations generated on the structure of a rotary-wing aircraft, in this case a helicopter, not depicted.

Figure 1:
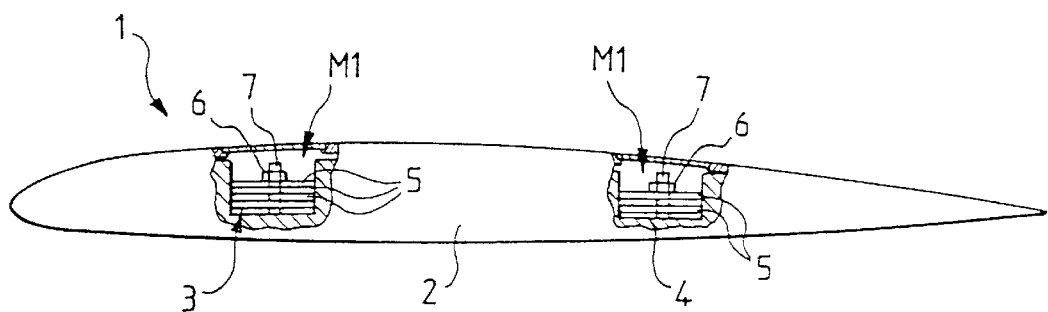
FIG. 1 diagrammatically illustrates adjusting means according to the invention, arranged along a rotor blade.

It is known that the main source of this vibration is the main rotor which provides the helicopter with lift and forward drive, and which rotates at a rotational speed Ω and is fitted with a number of blades such as the one 2 depicted in FIG. 1.

According to the invention, said device 1 comprises adjusting means M1 depicted in FIG. 1, for adjusting the second mode of flapping of each of the blades 2 of said main rotor.

According to the invention, said adjusting means M1 comprise adjusting masses 3 and 4:

which comprise metal washers 5 of varying thickness and density, held in place by a securing system, preferably comprising a nut 6 and bolt 7; and which are arranged along the blade 2 spanwise at one or more sections and/or along the chord, but preferably at least at two points, according to an adjustment according to the invention and specified hereinbelow.

Thus, by virtue of said appropriate spanwise and/or chordwise arrangement of said masses 3 and 4, the second mode of flapping of each blade 2 can be adjusted and the cause of the excitation of the vibrations in 3Ω in a stationary frame of reference associated with the helicopter structure can thus be eliminated.

Reducing the vibrations in 3Ω makes it possible, in particular, to increase the level of comfort of the crew and of the passengers and to reduce the phenomena of fatigue in certain parts of the helicopter.

Figure 2:
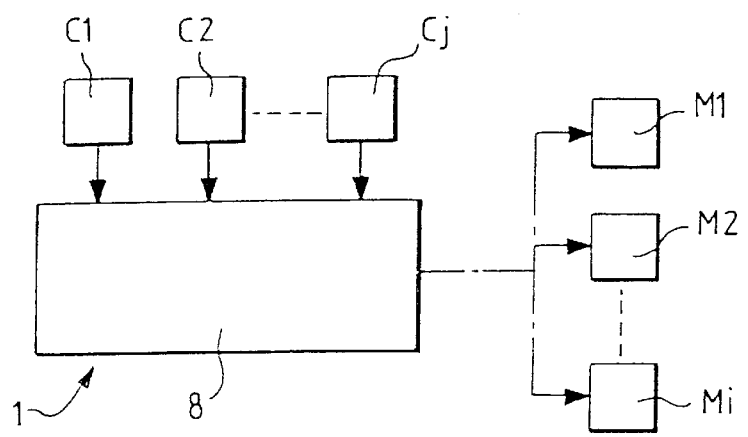
FIG. 2 diagrammatically depicts one preferred embodiment of the invention.

According to the invention, said device 1 additionally comprises, as depicted in FIG. 2:

a number of sensors C1 to Cj, for example accelerometers, capable of measuring the values of measurement parameters such as accelerations, which represent vibrations of said structure;

additional adjusting means M2 to Mi capable, as a function of adjustment values, of adjusting adjustment parameters specified hereinbelow and capable of influencing the vibrations of said structure; and a calculation unit 8, preferably a personal computer, capable, on the basis of the values measured by said sensors C1 to Cj, of calculating the adjustment values of said adjusting means M1 and of said additional adjusting means M2 to Mi to allow said vibrations of the structure to be minimized.

Figure 3:
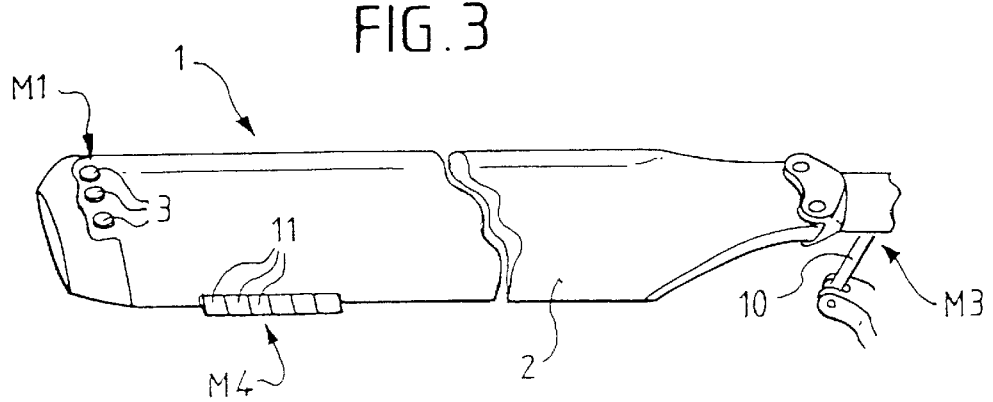
FIG. 3 diagrammatically illustrates various adjusting means of the embodiment of FIG. 2, arranged along a rotor blade.

According to the invention:

the adjusting means M2 are intended to arrange masses, not depicted, in the cuffs of the blades 2:

the adjusting means M3 are intended to adjust the length of the pitch rod 10 of each blade 2, as depicted in FIG. 3; and the adjusting means M4 are used to adjust the angle of balancing tabs 11 of said blades 2, these being depicted in FIG. 3.

Furthermore, the calculation unit 8 uses an influence matrix according to the invention and specified hereinbelow in order to determine the adjustment commands for said adjusting means.

According to the invention, to calculate this influence matrix, the following assumptions are taken into account:

all the blades of said main rotor have the same behavior;

said aircraft represents a solid body; and the relationship between the adjustment values and the measured values is a linear relationship.

The above assumptions apply to every measurement point of the sensors C1 to Cj and to every harmonic of the rotor speed. Thus, a measurement parameter representing a variation in acceleration $\Delta\gamma$ for a harmonic k at a point m due to the variation $\Delta P$ of an adjustment parameter P, located at a point p, is writen:

$$\Delta\gamma_{mp}^k = C_{mp}^k \Delta P_p,$$

$C_{mp}^k$ being an influence coefficient connecting the adjustment of the blades with the vibrations of the structure.

It should be noted that this influence coefficient is a complex number, because the vibrations can be represented in complex form (the modulus and the phase of the acceleration).

In total, the acceleration vector $\Delta\Gamma$ is associated with the $\Delta P$ adjustment vector by the relationship:

$$\Delta\Gamma = M \Delta P$$

where M is the influence matrix, that is to say the matrix of influence coefficients between the vibrations and the adjustments, which is determined for a given number of first harmonics and for clearly specified operating conditions (for example, movement along the ground, hovering flight, steady flight at various speeds, etc.).

The influence matrix is determined during a series of specific trials (ground and flight) from a helicopter which has a well-adjusted wing structure, which gives a minimum level of vibration, this minimum level of vibration serving as reference.

By varying each of the rotor adjustment parameters (masses of the cuffs, pitch rods 10, balance tabs 11, masses 3,4 along the span and/or along the chord) in turn, and recording the differences in vibrations (accelerations) with respect to the reference at various carefully chosen points in the helicopter cabin, the matrix M is obtained.

This matrix therefore, for each operating configuration and each harmonic, gives the coefficients between each measurement point and each adjustment parameter.

It will be noted that the final vibrations are the result of adding the elemental vibrations caused by the slipping of the adjustment of each of the parameters.

The influence matrix M thus obtained is used by the device 1 to adjust the wing structure when the helicopter exhibits a high level of vibration, and does so as follows.

Let us assume that n is number of the current flight and that the corresponding accelerations $\Gamma_n$ are being recorded. If the adjustment parameters P(masses, rods, etc) are then modified, $P_n$ being the set of adjustment parameters for the flight n and $P_{n+1}$ being the same set after modification, for the flight n+1, the accelerations $\Gamma_{n+1}$ in the next flight n+1 can be deduced from the parameters of the flight n according to the invention, using the relationship:

$$\Gamma_{n+1} = M(P_{n+1} - P_n) + \Gamma_n$$

The set of adjustment parameters $P_{n+1}$ which makes this acceleration $\Gamma_{n+1}$ minimal is determined mathematically. This is achieved by looking for a minimization function (for example using a least-squares method) which gives those values of the adjustment parameters P which best minimize this deviation in acceleration, and therefore the vibrations.

Thus, since by virtue of the invention, a direct relationship between the operation of the rotor and the levels of vibration of the structure is determined, very precise influence coefficients are obtained for said influence matrix, and this makes it possible to achieve an effective reduction of the various vibrations of the structure.

What is claimed is:

1. A device for reducing the vibration generated on the structure of a rotary-wing aircraft, particularly a helicopter, comprising:

at least one main rotor providing lift and forward drive and rotating at a rotational speed $\Omega$, first adjusting means for adjusting the second mode of flapping of each of the blades of said main rotor in order to move the second mode of flapping away from the $2\Omega$ and $3\Omega$ harmonics of the rotational speed $\Omega$, said adjusting means comprising adjusting masses including metal washers of varying thickness and density and arranged along the span of each of said blades and arranged at various points along the chord.

2. The device as claimed in claim 1, which additionally comprises:

a number of sensors for measuring the values of measurement parameters that represent the vibration of said structure;

additional adjusting means for, as a function of the adjusting values, adjusting adjustment parameters for influencing the vibration of said structure; and a calculation unit for, on the basis of the values measured by said sensors, calculating the adjusting values of said first adjusting means and of said additional adjusting means to allow the vibrations to be minimized, the adjusting values thus calculated being applied to said first adjusting means and to said additional adjusting means.

3. The device as claimed in claim 2, wherein said sensors comprise at least one accelerometer.

4. The device as claimed in claim 2, wherein said additional adjusting means comprise at least one of the following elements: auxiliary masses arranged in the cuffs of the blades; pitch rods; and balance tabs.

5. A device for reducing the vibration generated on the structure of a rotary-wing aircraft, particularly a helicopter, comprising:

at least one main rotor providing lift and forward drive, first adjusting means for adjusting the second mode of flapping of each of the blades of said main rotor, and a number of sensors for measuring the values of measurement parameters that represent the vibration of said structure;

additional adjusting means for, as a function of the adjusting values, adjusting adjustment parameters for influencing the vibration of said structure; and a calculation unit for, on the basis of the values measured by said sensors, calculating the adjusting values of said first adjusting means and of said additional adjusting means to allow the vibrations to be minimized, the adjusting values thus calculated being applied to said first adjusting means and to said additional adjusting means, wherein said calculation unit is a portable computer.

6. A process for reducing the vibration generated on the structure of a rotary-wing aircraft, particularly a helicopter, comprising the steps of:

(a) measuring the values of measurement parameters that represent the vibration of said structure;

(b) determining, on the basis of said values measured in step (a), the adjustment values of adjustment parameters for reducing and minimizing said vibration; and (c) adjusting said adjustment parameters to said adjustment values determined in step (b), wherein at least the second mode of flapping of each of the blades of a main rotor providing said rotary-wing aircraft with lift and forward drive and rotating at a rotational speed $\Omega$, is adjusted by way of an adjustment parameter, in order to move said second mode of flapping away from the $2\Omega$ and $3\Omega$ harmonics of the rotational speed $\Omega$.

7. The process as claimed in claim 6, wherein at least one of the following parameters of the blades of the main rotor is also adjusted, by way of adjustment parameters:

the value of the masses arranged in the cuffs of the blades;

the adjustment of the pitch rods; and the adjustment of balance tabs.

8. A process for reducing the vibration generated on the structure of a rotary-wing aircraft, particularly a helicopter, comprising the steps of:

(a) measuring the values of measurement parameters that represent the vibration of said structure;

(b) determining, on the basis of said values measured in step (a), the adjustment values of adjustment parameters for reducing and minimizing said vibration; and (c) adjusting said adjustment parameters to said adjustment values determined in step (b), wherein at least the second mode of flapping of each of the blades of a main rotor providing said rotary-wing aircraft with lift and forward drive is adjusted by way of an adjustment parameter, wherein, in step (b), said adjustment values are determined using an influence matrix which is formed taking account of the following assumptions:

all the blades of said main rotor have the same behavior;

said aircraft represents a solid body; and the relationship between the adjustment values and the measured values is a linear relationship.

9. The process as claimed in claim 8, wherein, in order to determine all of the adjustment values Pn+1 for a particular flight n+1, a matrix $\Gamma n+1$ is minimized, said matrix $\Gamma n+1$ representing said vibrations and being obtained from the expression:

$$\Gamma n+1 = M(Pn+1 - Pn) + \Gamma n+1$$

in which:

M is the influence matrix;

Pn is the set of adjustment values from the previous flight n; and $\Gamma n$ is a matrix containing all of the measurement values of said flight n which represent the vibrations and which are the result of the adjustment values Pn.

10. A process for reducing the vibration generated on the structure of a rotary-wing aircraft, particularly a helicopter, comprising the steps of:

(a) measuring the values of measurement parameters that represent the vibration of said structure;

(b) determining, on the basis of said values measured in step (a), the adjustment values of adjustment parameters for reducing and minimizing said vibration; and (c) adjusting said adjustment parameters to said adjustment values determined in step (b), wherein at least the second mode of flapping of each of the blades of a main rotor providing said rotary-wing aircraft with lift and forward drive is adjusted by way of an adjustment parameter, wherein steps (a)–(c) are repeated for a predetermined sequence of flights and for a particular flight and wherein, in step (b), the adjustment values are determined using an influence matrix which is formed on a reduced-vibration aircraft, from said adjustment values determined in step (b) and measured values of said measurement parameters, each of which is the result of performing steps (a)–(c) for a prior flight of said sequence of flights.

11. The process as claimed in claim 10, wherein, in order to determine all of the adjustment values Pn+1 for a particular flight n+1, a matrix $\Gamma n+1$ is minimized, said matrix $\Gamma n+1$ representing said vibrations and being obtained from the expression:

$$\Gamma n+1 = M(Pn+1 - Pn) + \Gamma n+1$$

in which:

M is the influence matrix;

Pn is the set of adjustment values from the previous flight n; and $\Gamma n$ is a matrix containing all of the measurement values of said flight n which represent the vibrations and which are the result of the adjustment values Pn.

* * * * *